Patented Feb. 12, 1952

2,584,968

UNITED STATES PATENT OFFICE 2,584,968

COPOLYMERS OF METHACRYLANILIDE WITH HIGHER ALKYL ACRYLIC ESTERS

Willard E. Catlin, Wilmington, Del., assignor to E. I. du Pont de Nemours and Company, Wilmington, Del., a corporation of Delaware No Drawing. Application June 24, 1950,
Serial No. 170,271

4 Claims. (Cl. 260—86.1)

This invention relates to copolymers and, more particularly, to novel copolymers peculiarly adapted for use as additives to lubricating oil.

Polymeric materials of various types have achieved commercial success because of particular desirable characteristics which they possess. Since each type of polymer has individual properties and combinations of properties differing from other polymers, the different types of polymers have been found particularly useful in certain applications but not in others. Also, in some applications the available polymeric materials are not entirely satisfactory and, hence, new polymers of improved properties in certain respects are desired.

An object of the present invention is to provide new copolymers having advantageous properties for various uses. A further object is to provide new copolymers adapted for use as additives to lubricating oil. A more particular object is to provide new copolymers soluble in lubricating oil and having the property of improving the viscosity index of the oil without at the same time unduly increasing the viscosity of the oil at low temperatures. Other objects will be apparent from the description of the invention given hereinafter.

The above objects are accomplished according to the present invention by providing a small class of new copolymers, these being the copolymers of methacrylanilide, i. e., N-phenylmethacrylamide, and alkyl esters of acrylic or methacrylic acids, the alkyl group in the ester containing from 8 to 18 carbon atoms, inclusive, with at least 8 of the carbon atoms being in a straight chain and the methacrylanilide amounting to 2% to 25% by weight of the copolymer. Preferably, the alkyl group in the alkyl ester contains from 10 to 14 carbon atoms, inclusive.

It has been found that the copolymers as above defined have advantageous properties for use in coating compositions, adhesives, and the like and, further, that they are outstandingly adapted for use as additives to lubricating oil in that they have the extremely desirable property of greatly improving the viscosity index of lubricating oil without at the same time unduly increasing the viscosity of the oil at low temperatures. The preferred copolymers wherein the alkyl group of the alkyl ester contains from 10 to 14 carbon atoms, inclusive, are the most effective of these copolymers as additives for lubricating oils from the standpoint of their influence on viscosity index.

The copolymers of this invention can be prepared by conventional bulk or solution methods of addition polymerization in the presence of an addition polymerization initiator. The polymerization is conveniently carried out by contacting a mixture of from 2% to 25% (by weight) of methacrylanilide and 98% to 75% of a long-chain alkyl acrylate or methacrylate with from 0.1% to 10%, preferably 0.2% to 2%, of a free radical-liberating type of initiator such as a peroxy compound, e. g., benzoyl peroxide or di(tertiary-amyl) peroxide or an azo initiator, e. g., 1,1'-azodicyclohexane-carbonitrile or alpha,alpha'-azodiisobutyronitrile, in the presence or absence of an inert solvent such as a hydrocarbon, e. g., benzene, white mineral oil or lubricating oil, and preferably in an inert atmosphere, e. g., under a blanket of nitrogen or carbon dioxide. The mixture is then agitated and maintained at a temperature at which the polymerization initiator generates free radicals rapidly. The exact temperature selected depends on the particular initiator being used. Temperatures ranging from room temperature or lower to 150° C. or higher are suitable.

The following examples illustrate this invention. In these examples the proportions of ingredients are expressed in parts by weight unless otherwise noted.

EXAMPLE I

A mixture of 18 parts of lauryl methacrylate (prepared from technical lauryl alcohol), 2 parts of methacrylanilide, and 0.15 part of alpha,alpha'-azodiisobutyronitrile, is placed in a reaction vessel fitted with an inlet tube reaching almost to the bottom and an opening for the escape of gas. The reaction vessel is placed in a water bath held at 55–60° C. and stirring is effected by bubbling oxygen-free nitrogen into the reaction mixture through the inlet tube. Heating is continued for 3 hours during which time the reactants polymerize to a tough, rubber-like mass. This lauryl methacrylate/methacrylanilide (90/10 by weight) copolymer is clear, homogeneous in appearance and soluble in hydrocarbon lubricating oils of both the naphthenic and paraffinic types.

EXAMPLE II

A copolymer of lauryl acrylate and methacrylanilide containing 15% methacrylanilide is prepared by the method of Example I from 17 parts of lauryl acrylate (made from technical lauryl alcohol), 3 parts of methacrylanilide, and 0.2 part of alpha,alpha'-azodiisobutyronitrile. This reaction mixture is blanketed with carbon dioxide instead of nitrogen and is heated 16 hours at 55–60° C. The resulting reaction mixture is a tough, rubber-like mass soluble in hydrocarbon lubricating oils of both the naphthenic and paraffinic types.

EXAMPLE III

A solution of 9 parts of n-octyl methacrylate, 1 part of methacrylanilide, and 0.03 part of alpha,alpha'-azodiisobutyronitrile in 10 parts of a low viscosity highly acid-treated white oil from Pennsylvania crude stock, is placed in a reaction vessel of the type used in Example I. Oxygen-free nitrogen is bubbled through the inlet tube and the mixture maintained at 65–70° C. for 18 hours. The resulting solution of n-octyl methacrylate/methacrylanilide (90/10) copolymer is clear and very viscous. This copolymer is soluble in naphthenic or mixed base lubricating oils of the Mid-Continent type.

EXAMPLE IV

A mixture of 185 parts of n-decyl methacrylate, 15 parts of methacrylanilide and 1.6 parts of alpha,alpha'-azodiisobutyronitrile is placed in a reaction vessel of the type used in the preceding examples. To this mixture there is then added 70 parts of solvent extracted paraffin base lubricating oil. The reaction vessel is placed in a bath held at 65° C. and stirring of the reactants is effected by passing carbon dioxide through the inlet tube. After polymerization has proceeded until the mixture has the consistency of corn syrup (about one hour) another 130 parts of the above lubricating oil is added during the course of about 2 hours. Heating is continued for a total of 7 hours, and the resulting product is a viscous, clear solution of n-decyl methacrylate/methacrylanilide copolymer (92.5/7.5). This copolymer is soluble in lubricating oils of both the naphthenic and paraffinic types.

It will be understood that the above examples are merely illustrative and that the invention broadly comprises the copolymers of methacrylanilide and alkyl esters of acrylic and methacrylic acids, the alkyl group in the esters containing from 8 to 18 carbon atoms, inclusive, with at least 8 of the carbon atoms being in a straight chain and the methacrylanilide amounting to 2% to 25% by weight of the copolymer.

In addition to the specific copolymers illustrated in the examples and those in Tables I and II below, the following are typical copolymers of the invention highly adapted for use as additives to lubricating oils: n-octadecyl methacrylate/methacrylanilide (98/2), n-tetradecyl acrylate/methacrylanilide (90/10), n-decyl acrylate/methacrylanilide (75/25), and n-nonyl methacrylate/methacrylanilide (80/20). All the new copolymers as herein defined are soluble in lubricating oils, although those containing the smaller proportions of the 8- to 10-carbon alkyl acrylates and methacrylates are less soluble in the paraffin base type of oil than in the naphthenic or mixed base types of oils.

The alkyl acrylate and methacrylate components of the polymers of this invention can be esters of either the pure alcohols or technical alcohols having 8 to 18 carbon atoms. Alkyl acrylates and methacrylates derived from technical lauryl alcohol are especially preferred components of the copolymers of this invention. A technical lauryl alcohol commercially available (obtained by reduction of coconut oil fatty acids) which is especially suitable, has the following approximate composition:

| | Per cent |
|---|---|
| $C_{10}H_{21}OH$ | 3 |
| $C_{12}H_{25}OH$ | 61 |
| $C_{14}H_{29}OH$ | 23 |
| $C_{16}H_{33}OH$ | 11 |
| $C_{18}H_{37}OH$ | 2 |

The lauryl esters of the examples are derived from technical lauryl alcohol of this composition.

The methacrylanilide component of the copolymers of this invention is conveniently prepared as follows: To a cooled, preferably below 30° C., and stirred slurry of 186 parts of aniline, 184.8 parts of sodium bicarbonate, and 0.5 part of m-dinitrobenzene in 1,000 parts of water, is added, during the course of one hour, 228 parts of methacrylyl chloride. After standing overnight at room temperature, the reaction mixture is filtered and the solid reaction product is recrystallized from a mixture of equal parts by volume of water and methanol. There is obtained after vacuum drying 284 parts, 91% of theory, of white crystalline methacrylanilide melting at 87° C.

Another method for preparing methacrylanilide for use in making the polymers of this invention is as follows: A stainless steel pressure reactor is charged with 93 parts of aniline, 23 parts of sodium, 0.1 part of ferric nitrate, and about 250 parts of liquid ammonia. The closed reactor is agitated for 24 hours at room temperature after which 100 parts of methyl methacrylate monomer (containing 0.05% hydroquinone as polymerization inhibitor) is injected into the reactor without stopping the agitation. After an hour the ammonia is allowed to distill out, and the reaction mixture, together with 0.1 part of m-dinitrobenzene, is poured into 1,000 parts of water. Upon stirring, crystalline methacrylanilide is formed by hydrolysis of the intermediate sodium-containing adduct. The product is separated by filtration, after which it is reslurried with water and made acid with acetic acid to remove residual alkali and aniline. After filtering, washing, and drying under reduced pressure there is obtained 114 parts, 71% of theory, of a light tan-colored product melting at 79–81° C. This product is suitable for copolymerization with long-chain alkyl acrylates or methacrylates without further purification.

The unique characteristics of the particular copolymers of this invention are clearly evident from a comparison of the properties of lubricating oils containing small proportions of these copolymers as additives in comparison with the same oils containing the same proportions of closely related polymers such as (a) the copolymers of methacrylanilide with alkyl acrylates or methacrylates having alkyl groups containing a number of carbon atoms outside the range specified for the products of this invention; (b) copolymers of long-chain alkyl acrylates and methacrylates with n-alkylmethacrylamides; and (c) copolymers of methacrylanilide with long-chain alkyl acrylates or methacrylates in proportions outside the range of 2 to 25% methacrylanilide specified above.

Lubricating oils having a low rate of change of viscosity with temperature are especially desirable for lubrication purposes. Judgment of the suitability of a lubricating oil for use over a wide range of operating temperatures is afforded by the "viscosity index" of the oil, which is calculated from the measured viscosities of the oil at 100° F.

and 210° F. by the standard ASTM method D 567-41. In this test, oils having the highest viscosity index show the least change in viscosity with change in temperature. An increase of 5 viscosity index units is a significant improvement. Another measurement of value for judging the suitability of lubricating oils, is the calculated slope of the line joining the points of intersection of the viscosities of the oil at 100° F. plotted as ordinates with the viscosities at 210° F. plotted as abscissas for different concentrations of additive. In this calculation, oils having the lowest values for slope exhibit the least change in viscosity with changes in temperature.

Viscosity data, viscosity index values, and slope values for two different types of lubricating oil containing as additives copolymers of this invention and closely related polymeric materials outside the copolymers of this invention are summarized in the following tables. In making the tests summarized below the polymer is blended with a lubricating oil by stirring the indicated proportion (per cent by weight) of polymer with the oil, e. g., 0.75 part of polymer with 49.25 parts of oil (or corresponding quantities of polymer solution to give this amount of polymer) to give a composition containing 1.5% of copolymer, while warming the mixture to 100–135° C. The viscosities of the modified oil compositions are determined by standard methods at temperatures of 100° F. and 210° F., and the results are expressed in centistokes.

The superior properties of typical copolymers of this invention in comparison with closely related polymers blended at 1.5% concentration in a low viscosity mixed base lubricating oil of the Mid-Continent type are summarized in Table I wherein modified oil compositions (1) to (6) include a copolymer of the present invention, composition (7) is a control, and compositions (8) to (15) include polymers closely related to but different from those of the present invention.

Table II below is similar to Table I except that the various polymers are blended with a paraffinic base lubricating oil. In Table II, modified oil compositions (1) to (4) include a copolymer of the present invention, composition (5) is a control, and compositions (6) to (11) include polymers closely related to but different from those of the present invention. Composition (12) includes a copolymer of the present invention which is relatively insoluble in the paraffin base lubricating oil, although such copolymer is soluble in mixed base lubricating oils as indicated by the closely similar copolymer in composition (6) of Table I.

*Table I*

1.5% POLYMER IN MIXED BASE LUBRICATING OILS

| Copolymer Ingredients | Proportions by Weight | Viscosity of Oil, in Centistokes | | Viscosity Index | Slope |
|---|---|---|---|---|---|
| | | At 100° F. | At 210° F. | | |
| (1) Lauryl methacrylate/methacrylanilide | 90/10 | 20.07 | 5.33 | 187 | 3.07 |
| (2) Lauryl methacrylate/methacrylanilide | 85/15 | 19.23 | 5.40 | 193 | 2.66 |
| (3) Lauryl methacrylate/methacrylanilide | 80/20 | 17.89 | 4.99 | 197 | 2.54 |
| (4) Lauryl methacrylate/methacrylanilide | 75/25 | 16.63 | 4.70 | 203 | 2.26 |
| (5) Lauryl acrylate/methacrylanilide | 85/15 | 19.56 | 4.85 | 179 | 3.67 |
| (6) n-Octyl methacrylate/methacrylanilide | 90/10 | 16.30 | 4.3 | 196 | 2.66 |
| (7) Control, no modifier | | 12.53 | 2.88 | 82 | |
| (8) Lauryl methacrylate/methacrylanilide | 70/30 | (1) | (1) | | |
| (9) Lauryl methacrylate/methacrylanilide | 60/40 | (1) | (1) | | |
| (10) 3,5,5-Trimethylhexyl methacrylate/methacrylanilide | 85/15 | (2) | (2) | | |
| (11) Lauryl methacrylate/n-cyclohexylmethacrylamide | 85/15 | (1) | (1) | | |
| (12) Lauryl methacrylate/n-tertiary-octylmethacrylamide | 85/15 | 27.93 | 6.44 | 167 | 4.32 |
| (13) Lauryl methacrylate/n-tertiary-octylacrylamide | 85/15 | 34.61 | 7.84 | 163 | 4.45 |
| (14) Lauryl acrylate/acrylanilide | 85/15 | 18.56 | 4.35 | 165 | 4.08 |
| (15) Lauryl methacrylate, per cent | 100 | 21.38 | 4.96 | 168 | 4.26 |

1 Incompletely soluble.
2 Insoluble.

*Table II*

1.5% IN SOLVENT EXTRACTED PARAFFIN BASE LUBRICATING OIL

| Copolymer Ingredients | Proportions by Weight | Viscosity of Oil, in Centistokes | | Viscosity Index | Slope |
|---|---|---|---|---|---|
| | | At 100° F. | At 210° F. | | |
| (1) n-Decyl methacrylate/methacrylanilide | 92.5/7.5 | 56.85 | 8.72 | 129 | 4.54 |
| (2) n-Decyl methacrylate/methacrylanilide | 90/10 | 58.48 | 10.25 | 144 | 3.65 |
| (3) Lauryl methacrylate/methacrylanilide | 92.5/7.5 | 56.87 | 8.68 | 128 | 4.64 |
| (4) Lauryl methacrylate/methacrylanilide | 85/15 | 61.35 | 9.83 | 136 | 4.88 |
| (5) Control, no modifier | | 46.83 | 6.52 | 98 | |
| (6) Lauryl methacrylate/acrylanilide | 90/10 | 60.51 | 8.83 | 124 | 5.96 |
| (7) Lauryl methacrylate/acrylanilide | 75/25 | 54.87 | 8.13 | 122 | 5.06 |
| (8) Lauryl acrylate/acrylanilide | 90/10 | 56.19 | 8.17 | 120 | 5.75 |
| (9) Lauryl acrylate/acrylanilide | 75/25 | (1) | (1) | | |
| (10) n-Decyl methacrylate/acrylanilide | 90/10 | 66.19 | 10.15 | 133 | 5.34 |
| (11) n-Hexyl methacrylate/methacrylanilide | 90/10 | (2) | (2) | | |
| (12) n-Octyl methacrylate/methacrylanilide | 85/15 | (2) | (2) | | |

1 Incompletely soluble.
2 Insoluble.

In addition to their high value as additives for lubricating oils the copolymers of this invention are also useful as coating compositions and adhesives, and for blending with other synthetic resins or plastics.

As many apparently widely different embodiments of this invention may be made without departing from the spirit and scope thereof, it is to be understood that the invention is not limited to the specific embodiments thereof except as defined in the appended claims.

The invention claimed is:

1. A copolymer of methacrylanilide and an alkyl ester of an acid from the group consisting of acrylic and methacrylic acids, the alkyl group in said esters containing from 8 to 18 carbon atoms, inclusive, with at least 8 of said carbon atoms being in a straight chain and said methacrylanilide amounting to 2% to 25% by weight of said copolymer.

2. A copolymer of methacrylanilide and lauryl methacrylate, said methacrylanilide amounting to 2% to 25% by weight of said copolymer.

3. A copolymer of methacrylanilide and lauryl acrylate, said methacrylanilide amounting to 2% to 25% by weight of said copolymer.

4. A copolymer of methacrylanilide and n-decyl methacrylate, said methacrylanilide amounting to 2% to 25% by weight of said copolymer.

WILLARD E. CATLIN.

REFERENCES CITED

The following references are of record in the file of this patent:

UNITED STATES PATENTS

| Number | Name | Date |
|---|---|---|
| 2,146,209 | Graves | Feb. 7, 1939 |
| 2,300,566 | Hahn | Nov. 3, 1942 |
| 2,311,548 | Jacobson et al. | Feb. 16, 1943 |

FOREIGN PATENTS

| Number | Country | Date |
|---|---|---|
| 573,529 | Great Britain | Nov. 26, 1945 |